(12) United States Patent
Kotani

(10) Patent No.: US 8,760,526 B2
(45) Date of Patent: Jun. 24, 2014

(54) INFORMATION PROCESSING APPARATUS AND METHOD FOR CORRECTING VIBRATION

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 12/764,573

(22) Filed: Apr. 21, 2010

(65) Prior Publication Data

US 2010/0295954 A1    Nov. 25, 2010

(30) Foreign Application Priority Data

May 21, 2009    (JP) ................................ 2009-123539

(51) Int. Cl.
*H04N 5/228* (2006.01)

(52) U.S. Cl.
USPC .................................... 348/208.4; 348/208.1

(58) Field of Classification Search
USPC .............. 348/333.12, 333.03, 208.1, 208.14, 348/352, 402.1, 413.1, 416.1, E7.007, 348/E7.008, 208.4
See application file for complete search history.

(56) References Cited

U.S. PATENT DOCUMENTS

| | | | |
|---|---|---|---|
| 6,735,383 B2 | 5/2004 | Imada | |
| 7,176,962 B2 | 2/2007 | Ejima | |
| 8,379,096 B2 * | 2/2013 | Torii et al. | 348/208.4 |
| 2006/0158523 A1 * | 7/2006 | Estevez et al. | 348/208.4 |
| 2007/0103562 A1 * | 5/2007 | Kaneko et al. | 348/222.1 |
| 2007/0253732 A1 | 11/2007 | Usui | |
| 2008/0030587 A1 * | 2/2008 | Helbing | 348/208.4 |
| 2008/0112644 A1 * | 5/2008 | Yokohata et al. | 382/278 |
| 2008/0143840 A1 * | 6/2008 | Corkum et al. | 348/208.6 |
| 2009/0123083 A1 * | 5/2009 | Kawase et al. | 382/254 |
| 2009/0154821 A1 * | 6/2009 | Sorek et al. | 382/250 |
| 2009/0232416 A1 * | 9/2009 | Murashita et al. | 382/294 |
| 2010/0295953 A1 * | 11/2010 | Torii et al. | 348/208.4 |
| 2011/0050920 A1 * | 3/2011 | Siddiqui et al. | 348/208.6 |

FOREIGN PATENT DOCUMENTS

| | | |
|---|---|---|
| JP | 2002-214657 A | 7/2002 |
| JP | 2002-258351 A | 9/2002 |
| JP | 2006-74693 A | 3/2006 |
| JP | 2006-86762 | 3/2006 |

* cited by examiner

*Primary Examiner* — Nicholas Giles
*Assistant Examiner* — Abdelaaziz Tissire
(74) *Attorney, Agent, or Firm* — Fitzpatrick, Cella, Harper & Scinto

(57) ABSTRACT

A plurality of image capturing data time-divisionally exposed by a capturing unit are input, and are divided into synthesis images or motion detection images. A motion amount of the capturing unit at the time of time-division exposure is detected from the image capturing data of the motion detection images, and synthesized image capturing data is generated by synthesizing the synthesis images. Then, a vibration of the synthesized image capturing data is corrected based on a divide pattern indicating divisions, and the motion amount.

12 Claims, 15 Drawing Sheets

F I G. 12
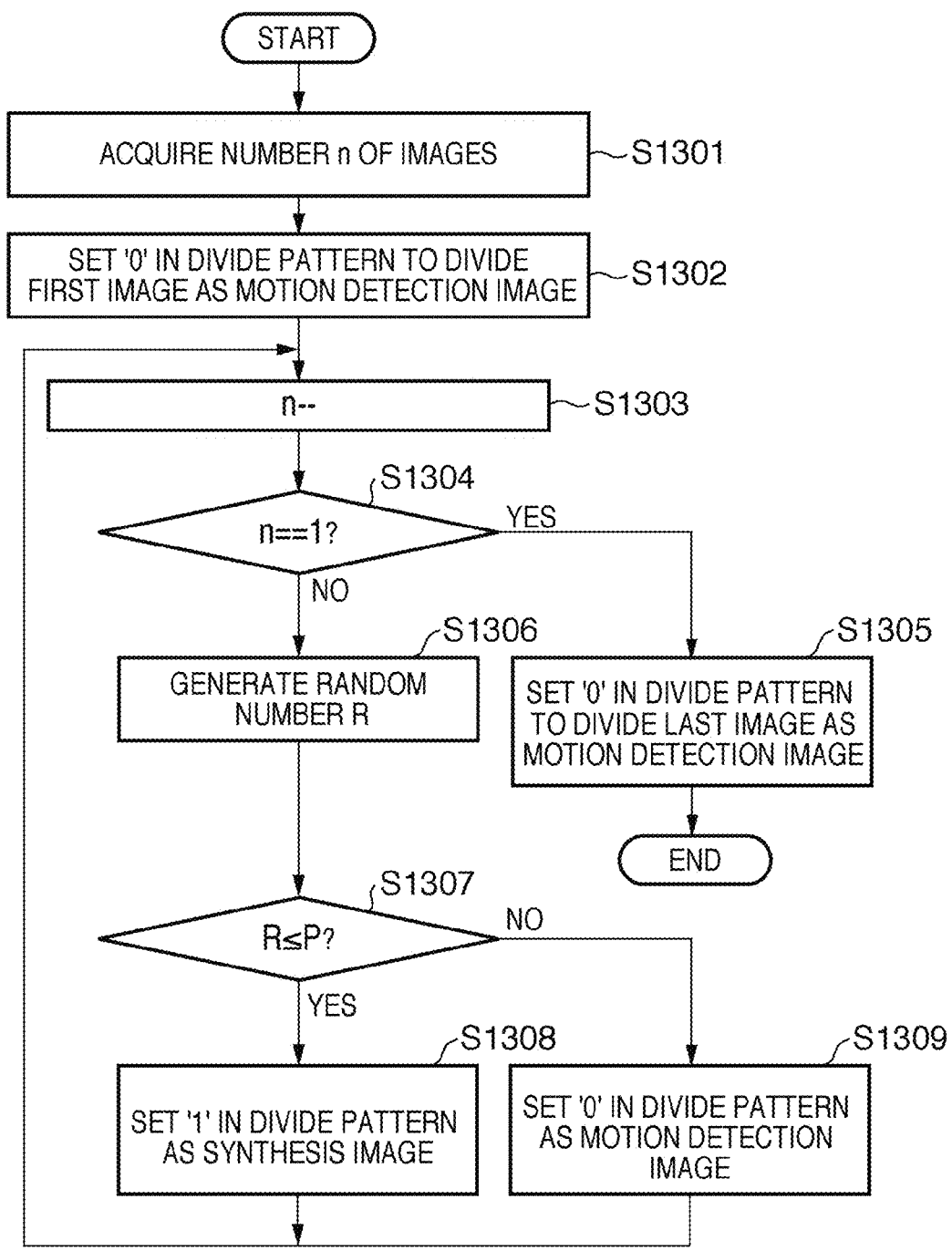

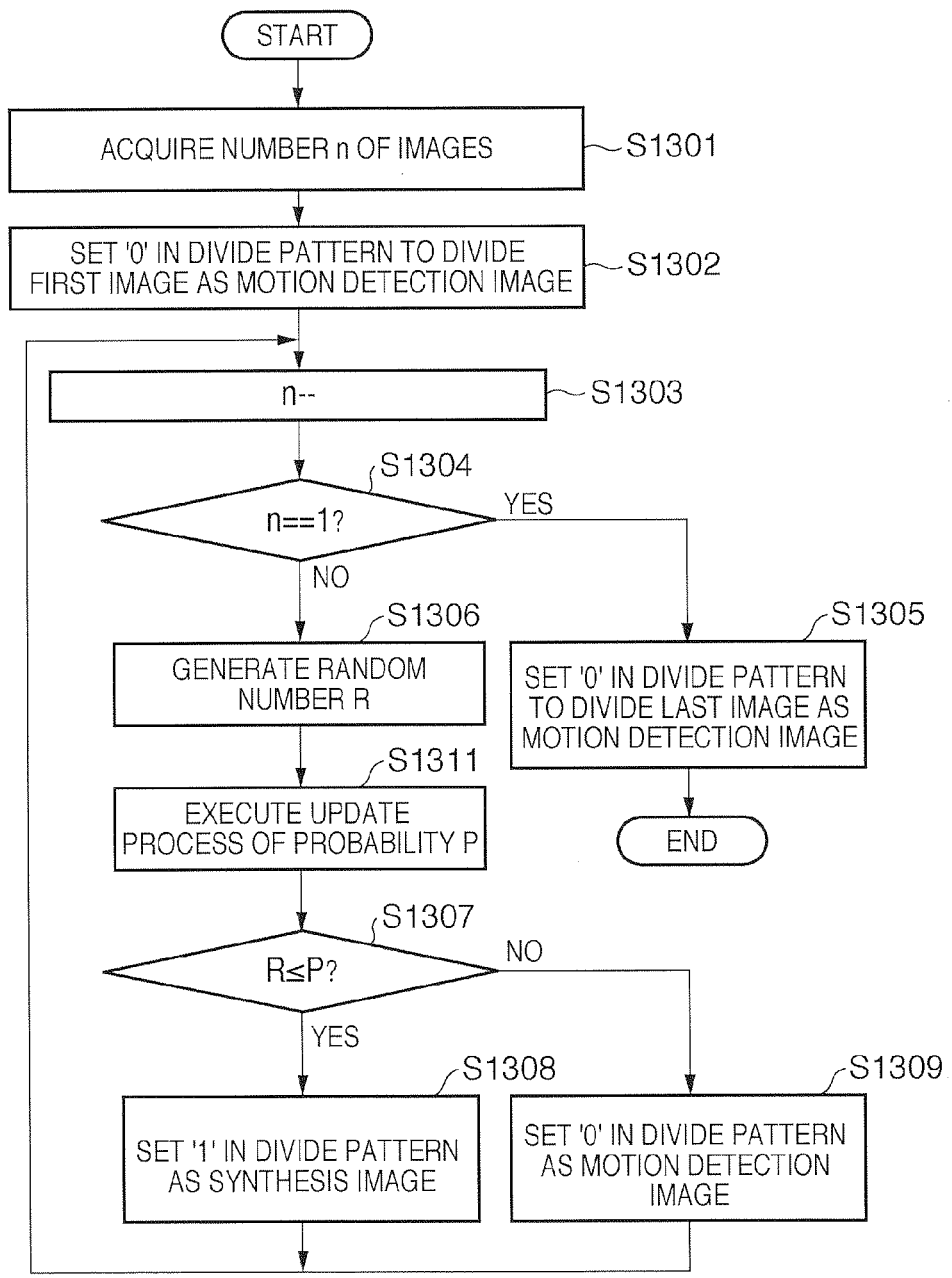

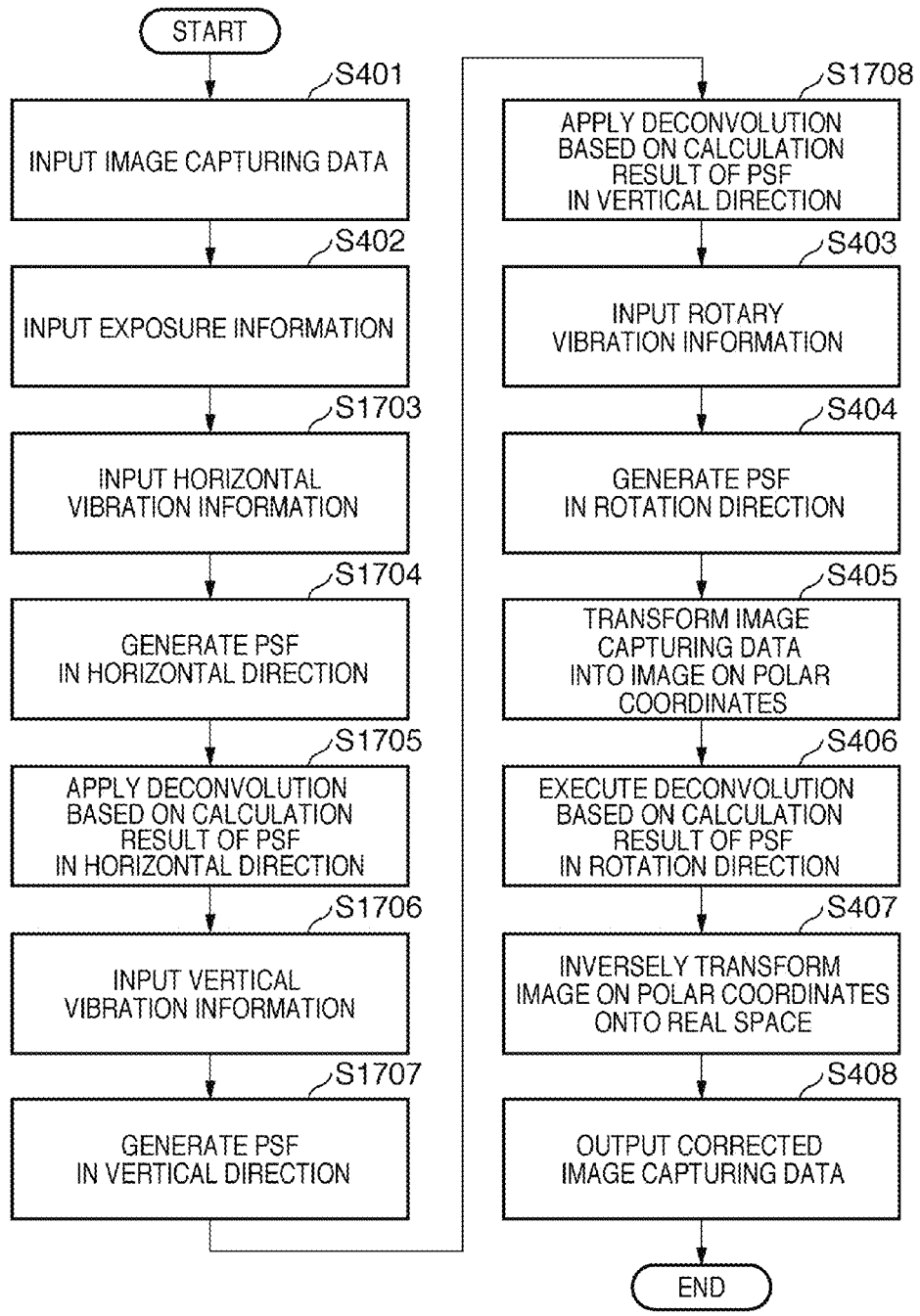

INFORMATION PROCESSING APPARATUS AND METHOD FOR CORRECTING VIBRATION

BACKGROUND OF THE INVENTION

1. Field of the Invention

The present invention relates to an image processing apparatus and image processing method, which corrects a blur of image capturing data that occurs due to vibration.

2. Description of the Related Art

A digital image easily allows an enlarged-scale displays to be displayed over 100% when using a personal computer. In an enlarged image, an image blur caused by even the slightest camera shake will stand out. For this reason, as image capturing devices for digital cameras gain higher resolutions, a process for correcting a camera shake that occurs at the time of imaging has received a lot of attention.

An image-stabilization method includes those implemented by hardware and software. In the hardware method, a gyro sensor is mounted on a camera, and the effects of a camera shake are eliminated by driving a lens and image capturing device to cancel vibrations of the camera during exposure based on an output signal from the gyro sensor. An image-stabilization method by means of a lens optical system is described in, for example, Japanese Patent Laid-Open No. 2002-214657.

The hardware image-stabilization method poses problems about an increase in number of components and that in manufacturing cost. When a similar function is to be implemented in an inexpensive digital camera, a software image-stabilization method is demanded.

In the software image-stabilization method, a method of synthesizing an image obtained by short exposure (to be referred to as a short exposure image hereinafter) and that obtained by long exposure (to be referred to as a long exposure image hereinafter) has been proposed (for example, Japanese Patent Laid-Open No. 2002-258351). Also, a method of acquiring a plurality of short exposure images, and synthesizing these images has been proposed (for example, Japanese Patent Laid-Open Nos. 2006-74693 and 2006-86762).

The method of Japanese Patent Laid-Open No. 2002-258351 corrects high-frequency components of the long exposure image using the short exposure image to recover an image blur. The method of Japanese Patent Laid-Open No. 2006-74693 aligns a plurality of short exposure images obtained by time-division exposure, so as to reduce their difference, and synthesizes these images, thereby recovering an image blur. Likewise, the method of Japanese Patent Laid-Open No. 2006-86762 synthesizes a plurality of images after blur correction while aligning their positions, thereby recovering an image blur.

However, the methods of Japanese Patent Laid-Open Nos. 2006-74693 and 2006-86762 suffer the following problems. In order to appropriately recover an image blur, a plurality of short exposure images are appropriately synthesized according to their displacement amounts. In other words, the appropriate image blur recovery process requires the accurate acquisition of displacement amounts. Therefore, a vibration amount between a given short exposure image and that captured immediately before or after that image has to be calculated. However, a process for accurately calculating a vibration amount and that for deforming and synthesizing images in correspondence with the vibration amount require very high calculation cost, resulting in a continuous shooting speed drop and a decrease in number of image capturing data that can be buffered.

SUMMARY OF THE INVENTION

In one aspect, an image processing apparatus comprising: an input section, configured to input a plurality of image capturing data time-divisionally exposed by a capturing unit; a divider, configured to divide the plurality of image capturing data into synthesis images or motion detection images; a detector, configured to detect a motion amount of the capturing unit at the time of time-division exposure from the image capturing data of the motion detection images; a synthesizer, configured to generate synthesized image capturing data by synthesizing the synthesis images; and a corrector, configured to correct a vibration of the synthesized image capturing data based on a divide pattern indicating divisions by the divider, and the motion amount.

In another aspect, an image processing method comprising: using a processor to perform the steps of: inputting a plurality of image capturing data time-divisionally exposed by a capturing unit; dividing the plurality of image capturing data into synthesis images or motion detection images; detecting a motion amount of the capturing unit at the time of time-division exposure from the image capturing data of the motion detection images; generating synthesized image capturing data by synthesizing the synthesis images; and correcting a vibration of the synthesized image capturing data based on a divide pattern indicating divisions in the dividing step, and the motion amount.

According to these aspects, a blur of image capturing data that occurs due to vibration can be effectively corrected.

Further features of the present invention will become apparent from the following description of exemplary embodiments with reference to the attached drawings.

BRIEF DESCRIPTION OF THE DRAWINGS

FIG. 12 is a flowchart for explaining a divide pattern generation process.

FIG. 15 is a flowchart for explaining a divide pattern generation process according to the third embodiment.

FIG. 16 is a flowchart for explaining a process for correcting an image blur by a coded exposure process.

DESCRIPTION OF THE EMBODIMENTS

Image processing apparatuses and image processing method according to embodiments of the present invention will be described in detail hereinafter with reference to the drawings. Note that an example in which an arrangement for correcting a camera shake is built in a digital camera will be explained hereinafter.

First Embodiment

Arrangement of Camera

Figure 1A:
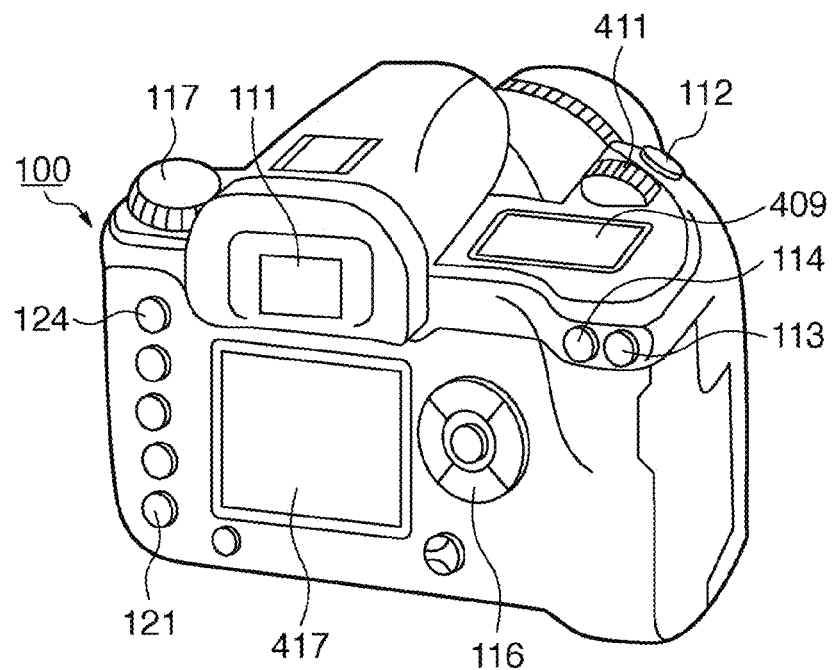
FIGS. 1A and 1B are respectively a perspective view and cross-sectional view of a digital camera.
Figure 1B:
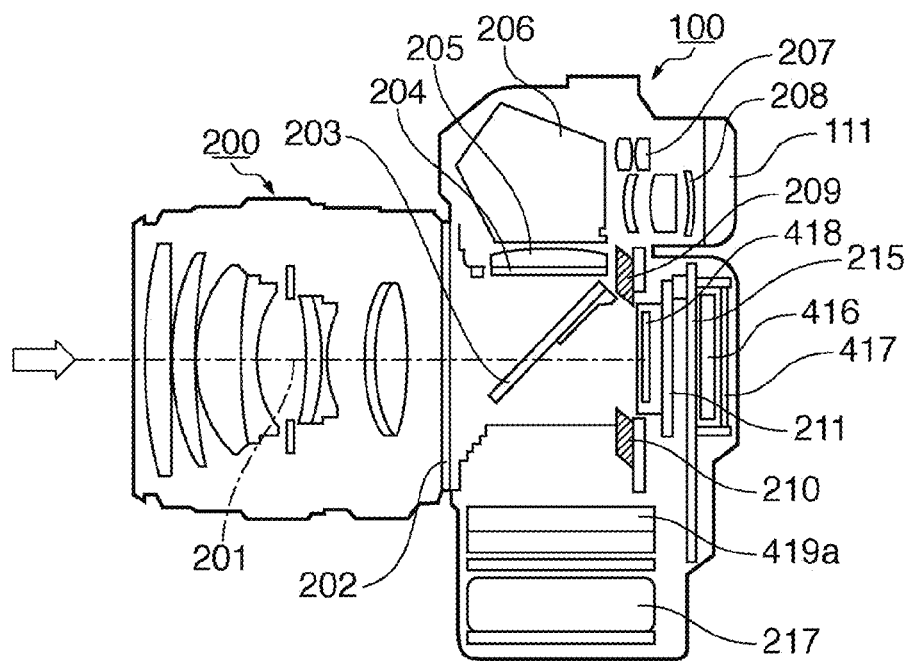

FIGS. 1A and 1B are respectively an external view and cross-sectional view of a digital camera.

A viewfinder eyepiece 111, auto-exposure (AE) lock button 114, button 113 used to select auto-focus (AF) points, and release button 112 used to start an imaging operation are arranged on the top portion of a camera body 100. Also, an imaging mode selection dial 117, external display unit 409, digital dial 411, and the like are arranged.

The digital dial 411 serves as a multi-function signal input unit which is used to input a numerical value to the camera in cooperation with another operation button and to switch an imaging mode. The external display unit 409 as an LCD panel displays imaging conditions including a shutter speed, stop, and imaging mode, and other kinds of information.

On the back surface of the camera body 100, a liquid crystal display (LCD) monitor 417 which displays an image caught by the camera, that captured by the camera, various setting screens, and the like, a switch 121 used to turn on/off display of the LCD monitor 417, cross keys 116, a menu button 124, and the like are arranged. Since the LCD monitor 417 is of transmission type, the user cannot view an image by driving only the LCD monitor 417. For this reason, a backlight is required on the rear surface of the LCD monitor 417, as will be described later.

The cross keys 116 include four buttons arranged at upper, lower, right, and left positions, and a setting button arranged at the center, and are used to instruct to select and execute menu items displayed on the LCD monitor 417.

The menu button 124 is used to display a menu screen on the LCD monitor 417. For example, when the user wants to select and set an imaging mode, he or she presses the menu button 124, and then selects a desired imaging mode by operating the upper, lower, right, and left buttons of the cross keys 116. Then, the user presses the setting button while the desired imaging mode is selected, thus completing the setting of the imaging mode. Note that the menu button 124 and cross keys 116 are also used to set an AF mode to be described later.

An imaging lens 200 of an imaging optical system is detachable from the camera body 100 via a lens mount 202.

A mirror 203, arranged in an imaging optical path having an imaging optical axis 201 as the center, is allowed to be quickly returned between a position where object light from the imaging lens 200 is guided to a viewfinder optical system (slant position) and an escape position outside the imaging optical path.

Object light guided to the viewfinder optical system by the mirror 203 forms an image on a focusing screen 204. The object light passed through the focusing screen 204 is guided to an eyepiece lens 208 and photometry sensor 207 via a condenser lens 205 and pentagonal roof prism 206, which are required to improve the visibility of a viewfinder.

A first curtain 210 and second curtain 209 form a focal plane shutter (mechanical shutter). By opening and closing the two curtains 209 and 210, an image capturing device 418 such as a charge-coupled device (CCD) or CMOS sensor, which is arranged behind these curtains, is exposed for a required time. The image capturing device 418 is held on a printed circuit board 211. Another printed circuit board 215 is arranged behind the printed circuit board 211, and the LCD monitor 417 and a backlight 416 are arranged on the surface, opposite to the board 211, of the printed circuit board 215.

Furthermore, the camera body 100 includes a recording medium 419a used to record image data, and a battery 217 as a portable power supply. Note that the recording medium 419a and battery 217 are detachable from the camera body 100.

Figure 2:
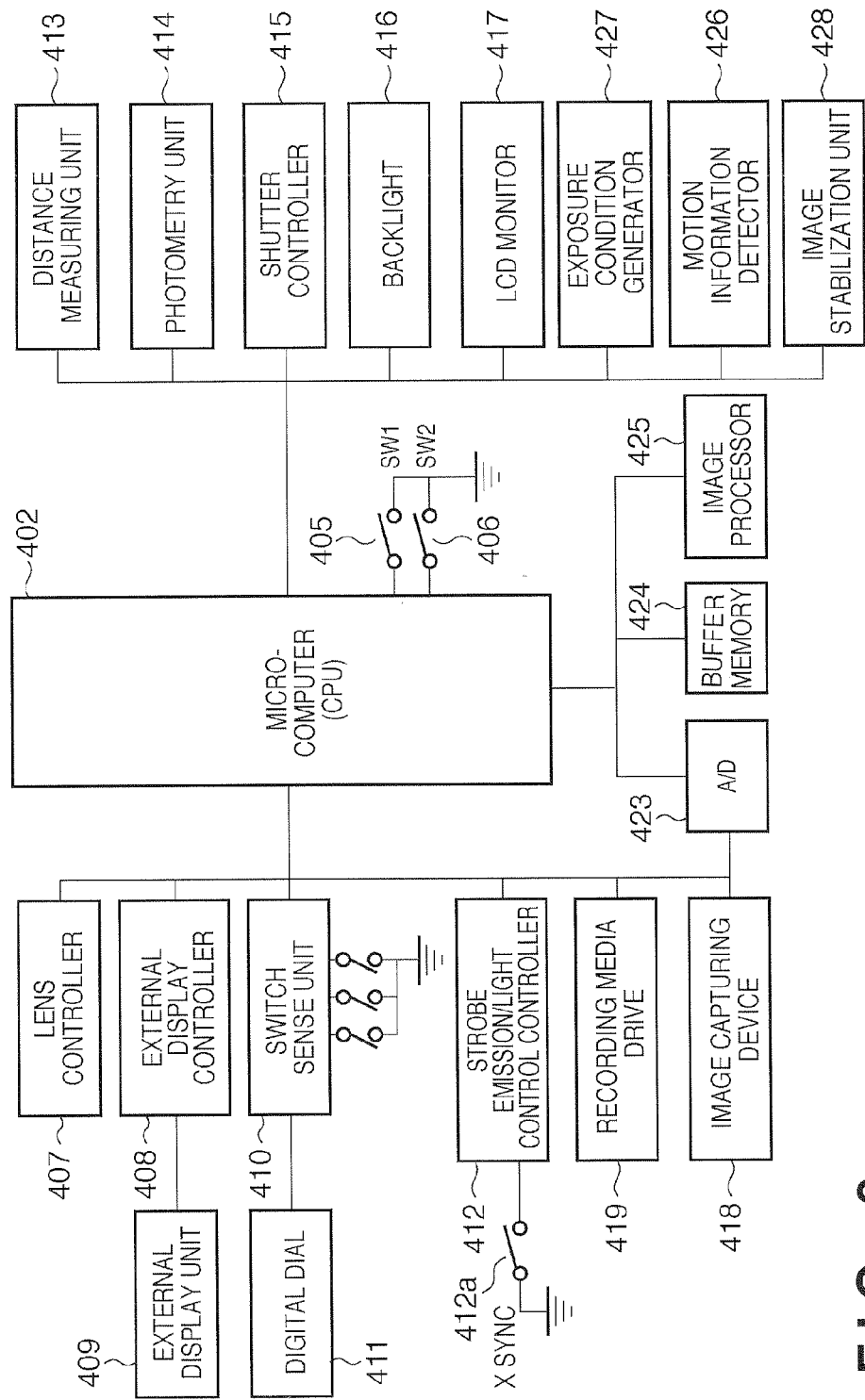
FIG. 2 is a block diagram showing the arrangement associated with control, imaging, and image processes of the digital camera.

FIG. 2 is a block diagram showing the arrangement associated with control, imaging, and image processes of the digital camera.

A microcomputer (CPU) 402 controls the operation of the overall camera including the processes of image data output from the image capturing device 418 and display control of the LCD monitor 417.

A switch (SW1) 405 is turned on when the release button 112 is pressed halfway (a halfway pressing state). When the switch (SW1) 405 is turned on, the camera is set in an imaging ready state. A switch (SW2) 406 is turned on when the release button 112 is fully pressed (a full pressing state). When the switch (SW2) 406 is turned on, the camera body 100 starts an imaging operation.

A lens controller 407 communicates with the imaging lens 200 to execute driving control of the imaging lens 200 and that of an aperture in an AF mode. An external display controller 408 controls the external display unit 409 and a display unit (not shown) inside the viewfinder. A switch sense unit 410 is an interface used to transfer signals output from many switches and keys including the aforementioned digital dial 411 to the CPU 402.

A strobe controller 412 is grounded through an X sync 412a to control light emission and execute light control of an external strobe. To a recording media drive 419, the recording medium 419a such as a hard disk or memory card is attached.

A distance measuring unit 413 detects a defocus amount with respect to an object for the purpose of AF control. A photometry unit 414 measures a luminance level of an object to decide an exposure time. A shutter controller 415 controls the mechanical shutter so as to properly expose the image capturing device 418. The LCD monitor 417 and backlight 416 form a display device, as described above.

An image processor 425 includes a digital signal processor (DSP). A motion information detector 426 detects a camera motion due to, for example, a camera shake by a gyro sensor. The output from the motion information detector 426 is used to drive the imaging lens 200 and image capturing device 418 to cancel camera vibrations.

An exposure condition generator 427 generates an exposure condition required to correct an image blur due to a vibration, and controls an electronic shutter based on the generated exposure condition. Note that the electronic shutter is controlled by sweep-out pulses and read pulses supplied to the image capturing device 418.

Furthermore, an analog-to-digital converter (A/D) 423, a buffer memory 424 used to buffer image data, and the like are connected to the CPU 402.

[Acquisition of Image Data]

As will be described in detail later, the A/D 423 and image processor 425 process images, which are time-divisionally exposed under the control of the exposure condition generator 427 within a time period decided by the photometry unit 414, thereby acquiring a plurality of image capturing data of an object.

Note that the image capturing data is data before demosaicing (developing process) (to be also referred to as RAW data hereinafter), which is obtained by converting a signal output from the image capturing device 418 as a capturing unit into digital data by the A/D 423. Note that at least the image capturing device 418 forms the capturing unit. A combination of the image capturing device 418, A/D 423, and imaging lens 200 is often called a capturing unit. Alternatively, the camera body 100 is often called a capturing unit.

An image stabilization unit 428 additionally synthesizes image capturing data selected according to a divide pattern (to be described later). Then, the image stabilization unit 428 applies an image stabilization process to the synthesized image capturing data based on the divide pattern and motion information output from the motion information detector 426, thereby generating image capturing data in which a blur due to a vibration is corrected.

The image processor 425 applies demosaicing to the image capturing data corrected by the image stabilization unit 428 to generate image data. Then, the image processor 425 applies various image processes to the generated image data, and stores the image data after the image processes in the recording medium. Note that image capturing data before demosaicing may be stored in the recording medium.

[Overview of Coded Exposure Process]

The image stabilization unit 428 corrects an image blur due to, for example, a camera shake using a technique called coded exposure. The coded exposure is a technique for correcting an image blur using correlations between images obtained by randomly opening and closing a shutter during a designated exposure time (flutter shutter), and an opening and closing pattern of the shutter.

A basic sequence of the coded exposure process will be described below taking as an example a case in which an image blur due to a vibration in a rotation direction (rotary vibration) is to be corrected. After that, the coded exposure process of this embodiment will be explained.

Figure 3:
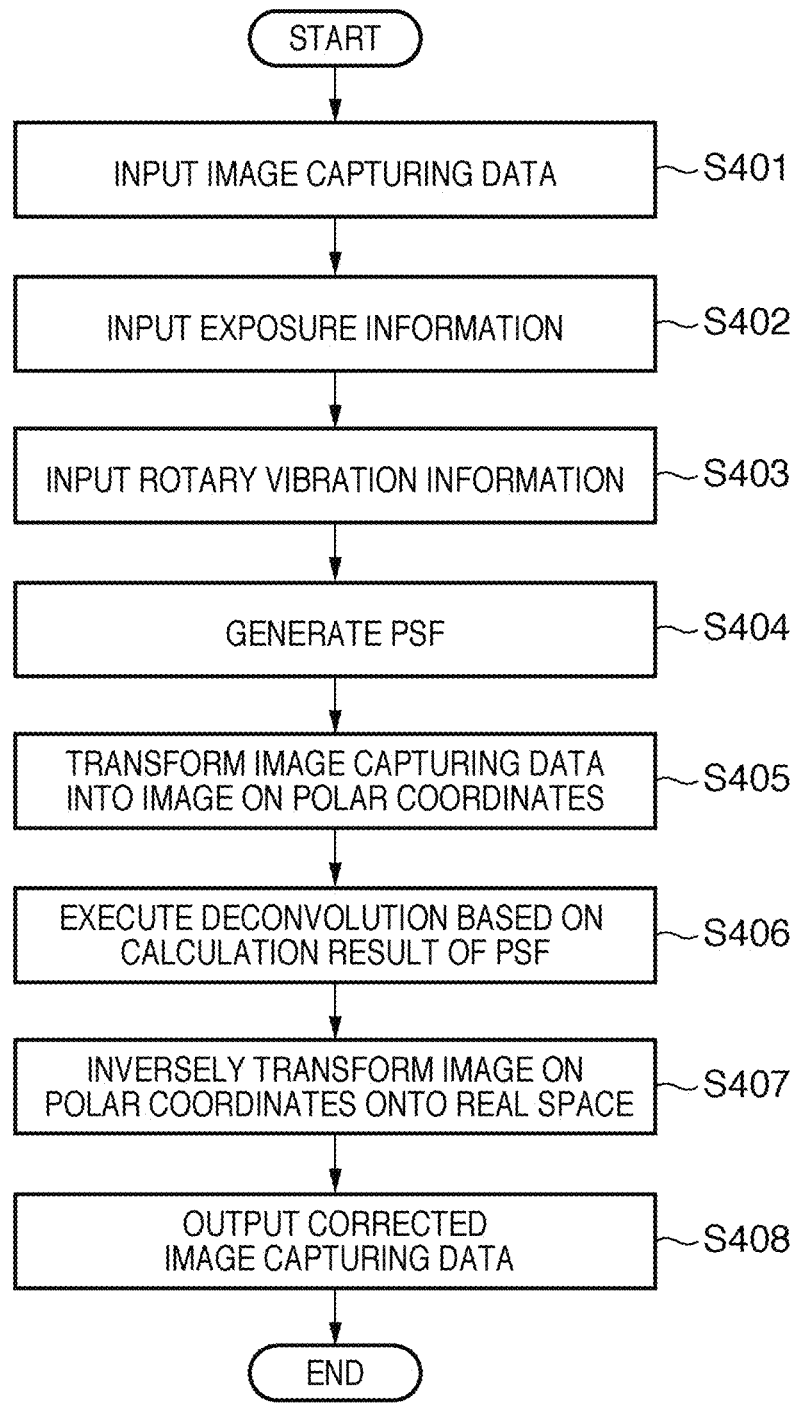
FIG. 3 is a flowchart for explaining a process for correcting an image blur by a coded exposure process.

FIG. 3 is a flowchart for explaining a process for correcting an image blur by the coded exposure process.

Image capturing data captured by the flutter shutter are input (S401).

Let $I(x, y)$ be an intensity of light that enters a pixel $(x, y)$ of the image capturing device 418 per unit time, $\omega(t)$ be an angular velocity, and $T$ be an exposure time. Since information obtained by rotating $I(x, y)$ through $-\theta(T-t)$ enters the camera at time $t$, image capturing data $I_{blur}$ is expressed by the following formulas. Note that the origin of the coordinate system is matched with the position coordinates of a rotational center indicated by rotary vibration information (to be described later).

$$I_{blur}(x,y)=1/T\int_{t=0}^{T}h(t)I\{x\cdot\cos\theta(T-t)+y\cdot\sin\theta(T-t),-x\cdot\sin\theta(T-t)+y\cdot\cos\theta(T-t)\}dt$$

$$=1/T\int_{t=0}^{T}h(T-t)I\{x\cdot\cos\theta(t)+y\cdot\sin\theta(t),-x\cdot\sin\theta(t)+y\cdot\cos\theta(t)\}dt \quad (1)$$

$$=1/T\int_{\omega=0}^{\omega}h(\theta)/\omega(\theta)\cdot I\{x\cdot\cos\theta+y\cdot\sin\theta,-x\cdot\sin\theta+y\cdot\cos\theta\}d\theta \quad (2)$$

$$=1/T\int_{\omega=0}^{\omega}h'(\theta)\cdot I\{x\cdot\cos\theta+y\cdot\sin\theta,-x\cdot\sin\theta+y\cdot\cos\theta\}d\theta \quad (3)$$

where a function $h(t)$ represents opening and closing of the shutter: shutter open=1; shutter close=0.

In the modification from formula (1) to formula (2), an integration variable is transformed. $\omega(t)=d\theta/dt$. Also, $\omega(\theta)$ is a function by rewriting $h(t)$ to have $\theta$ as a variable using the relationship between t and $\theta$. Likewise, $h(\theta)$ is a function by rewriting $h(t)$ to have $\theta$ as a variable using the relationship between t and $\theta$. In formula (3), $h'(\theta)=h(\theta)/\omega(\theta)$.

Next, exposure information indicating the shutter opening and closing pattern is input (S402), and rotary vibration information indicating the relationship between a vibration angle $\theta$ and time is input (S403). Then, as will be described in detail later, $h'(\theta)$ as a point spread function (PSF) on polar coordinates is calculated based on the rotary vibration information and exposure information (S404).

Then, the image capturing data is transformed into an image on the polar coordinates (S405). As described above, the origin of the orthogonal coordinate system in this transformation is matched with the central coordinates of a rotation indicated by the rotary vibration information. By polar coordinate transformation, formula (3) is transformed into:

$$I_{blur}(r,\Theta)=1/T\int_{\omega=0}^{\omega}h'(\theta)I(r,\Theta-\theta)d\theta=1/T\cdot(h'*I)(r,\Theta) \quad (4)$$

where * represents a convolution operation, and $(x, y)$ in formula (3) is $r(\cos\Theta, \sin\Theta)$.

Formula (4) is the same formula as a vibration with respect to translation, and can be considered as that which has undergone convolution by $h'(\theta)$ as the PSF. However, formula (4) is a logical formula, and actual data are digital values. Hence, arbitrary interpolation is required to transform a real space into a polar coordinate space. An arbitrary interpolation method can be used. In this embodiment, a bilinear method is used.

As will be described in detail later, deconvolution that cancels the convolution of formula (4) is made based on the calculation result of the PSF (S406). A deconvolution algorithm may use an existing arbitrary algorithm. For example, divisions on a frequency space, a Lucy-Richardson algorithm, an algorithm using a Wiener filter, an algorithm using a normalized filter, and the like are available. In this embodiment, as will be described in detail later, the shape of $h'(\theta)$ is controlled by controlling the opening and closing pattern, thus implementing the divisions on the frequency space.

Since $I(r, \Theta)$ is obtained by the deconvolution, $I(r, \Theta)$ is inversely transformed into a real space indication $I(x, y)$ (S407). This inverse transformation requires an interpolation process as in the transformation from the real space into the polar coordinate space. Then, $I(x, y)$ is output as image capturing data after correction (S408).

Figure 4:
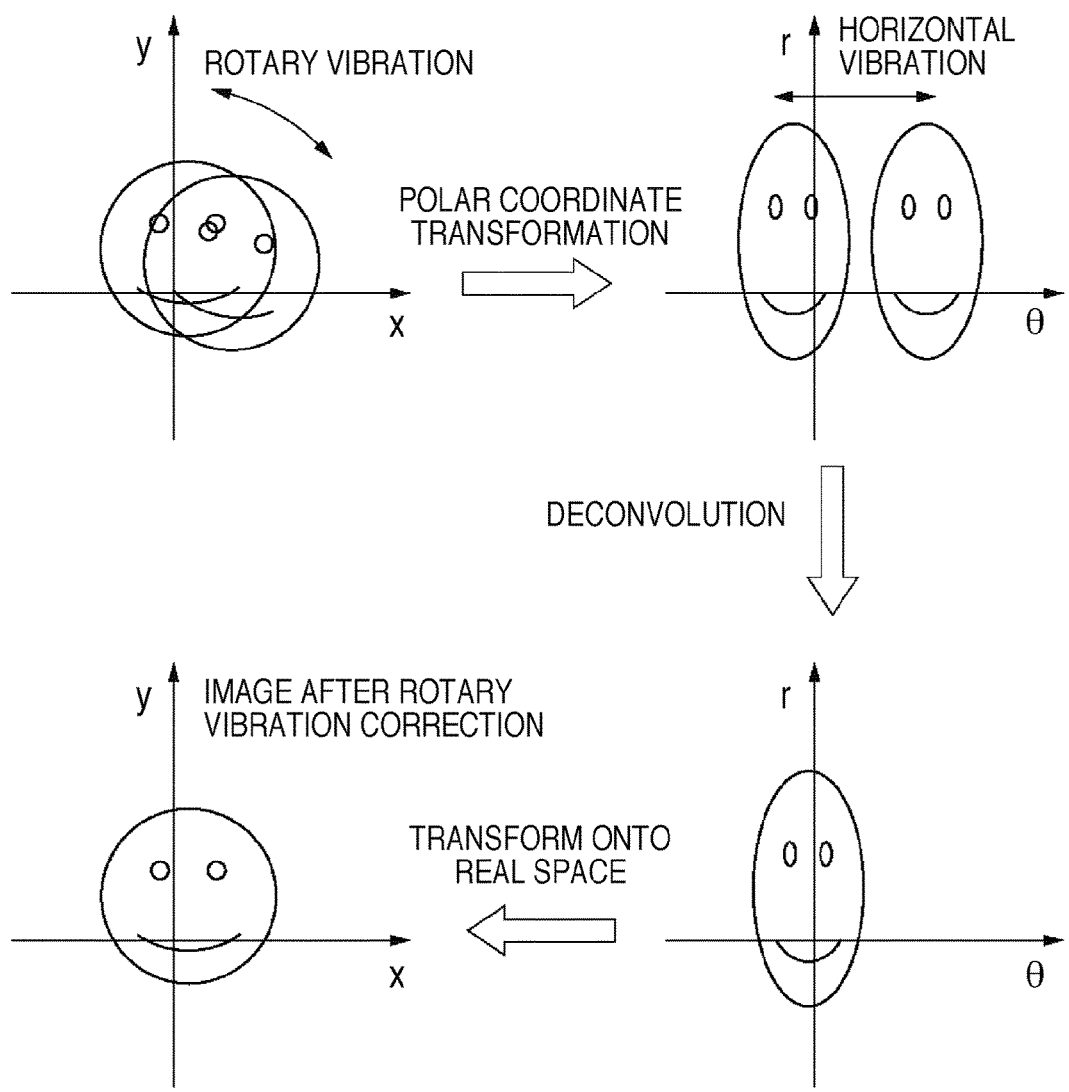
FIG. 4 is a conceptual view showing the correction principle of an image blur.

FIG. 4 is a conceptual view showing the correction principle of an image blur. That is, a rotary vibration is transformed into a vibration in an angle $\Theta$-axis direction (horizontal vibration) by the polar coordinate transformation, and the horizontal vibration of the image is removed by the deconvolution. The image in which the horizontal vibration is removed is inversely transformed into the real space, thus obtaining an image in which the rotary vibration is removed.

In this manner, for images obtained by the flutter shutter, an image blur due to a rotary vibration can be corrected based on the opening and closing pattern (exposure information) of the flutter shutter and the rotary vibration information. Note that the rotary vibration information can be acquired from the motion information detector 426, and the exposure information can be acquired from the exposure condition generator 427 in this embodiment.

In the description of the above example, since an image blur due to a rotary vibration is a correction target, the processes are executed after image capturing data is transformed onto polar coordinates. However, by executing the processes without transforming image capturing data onto polar coordinates, a blur due to a vibration in the horizontal direction (horizontal vibration) and that in the vertical direction (vertical vibration), which are so-called shift vibrations, can also be corrected. For example, a blur due to shift vibrations may be corrected before transformation onto polar coordinates, and a blur due to a rotary vibration may then be corrected.

PSF Generation Method

Figure 5:
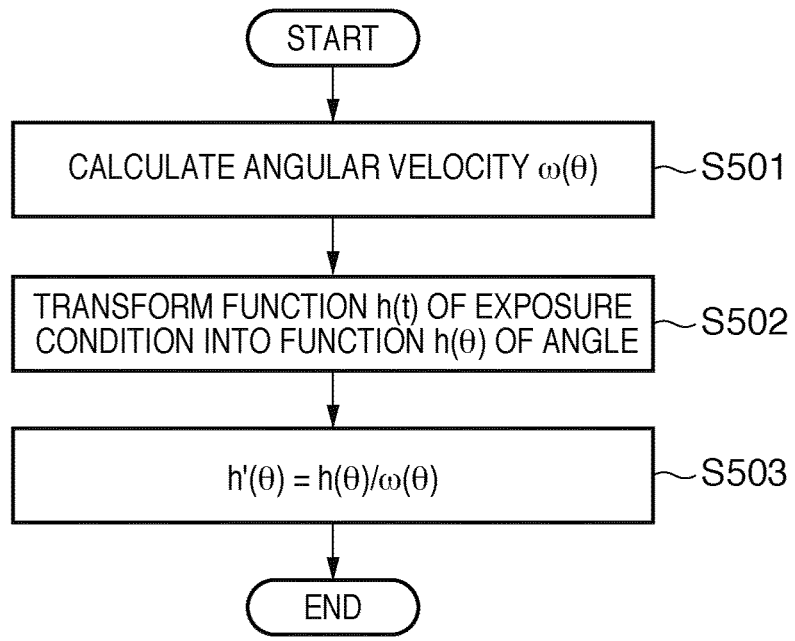
FIG. 5 is a flowchart for explaining a PSF generation process.

FIG. 5 is a flowchart for explaining the PSF generation process (S404).

An angular velocity ω(t) is calculated by differentiating an angle θ by a time based on the input rotary vibration information (S501). By combining the angular velocity ω(t) and θ(t), the angular velocity can be expressed as a function of θ. Let ω(θ) be this function.

Next, a function h(t) is acquired as a function of θ based on the input exposure information and rotary vibration information (S502). Let h(θ) be this function.

Then, h'(θ)=h(θ)/ω(θ) is calculated as a PSF based on the acquired information (S503). As described by formula (3), h'(θ) is the PSF on the polar coordinates.

Figure 6:
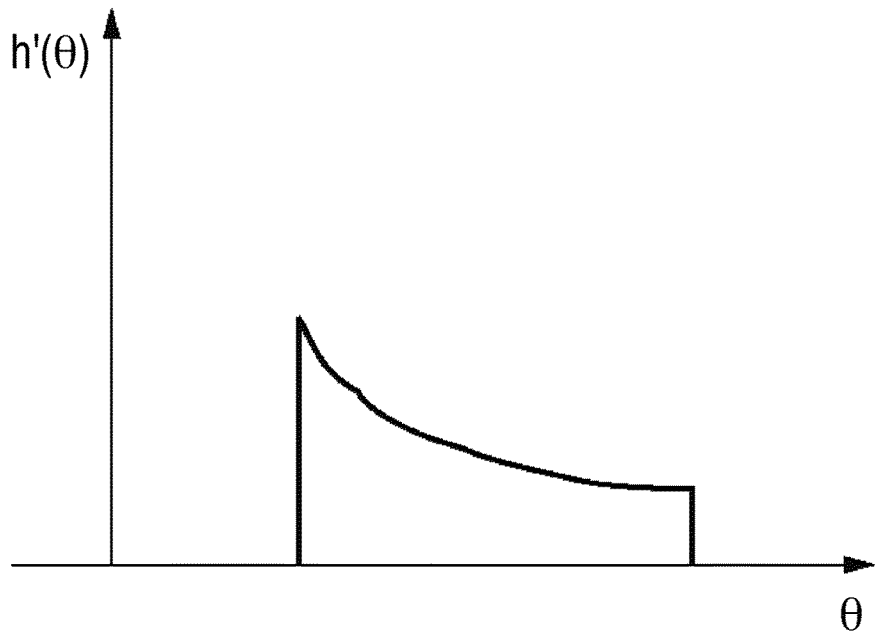
FIG. 6 is a graph showing an example of a PSF in a general rotary motion.

FIG. 6 shows an example of a PSF in a general rotary motion. In FIG. 6, the abscissa plots the angles (rad), and the ordinate plots the values of the PSF. Assuming that the opening and closing pattern is given by h(t)=1 for 0≤t≤T and by h(t)=0 for the other case, and an acceleration motion is being made, since ω(θ) increases, the value of h'(θ) as the PSF decreases.

Deconvolution

The transformation of formula (4) onto the frequency space yields:

$$I_{blur}(f,\rho)=1/T\cdot H'(f,\rho)\,I(f,\rho) \qquad (5)$$

where f is a variable corresponding to the frequency transformation of r, and

ρ is a variable corresponding to the frequency transformation of Θ.

Since H'(f, ρ) is given, when $I_{blur}$(f, ρ) is divided by H'(f, ρ) on the frequency space, I(f, ρ) is calculated in principle. However, this poses a problem, and the following description will be made under the assumption that ω(θ) is constant in consideration of a vibration due to an equi-angular velocity motion.

Figure 7A:
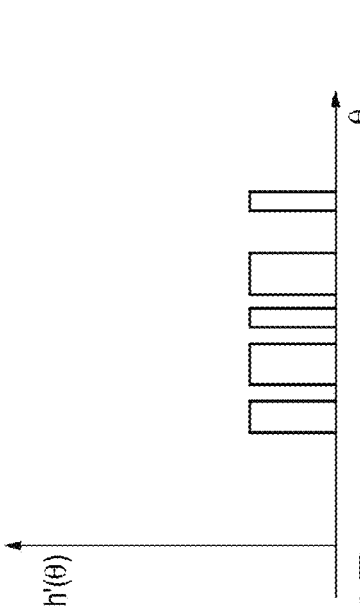
FIGS. 7A and 7B are graphs showing the shape and frequency characteristics of a PSF when $h(t)=1$ for $0 \le t \le T$ as a normal exposure condition and $h(t)=0$ for the other case.
Figure 7B:
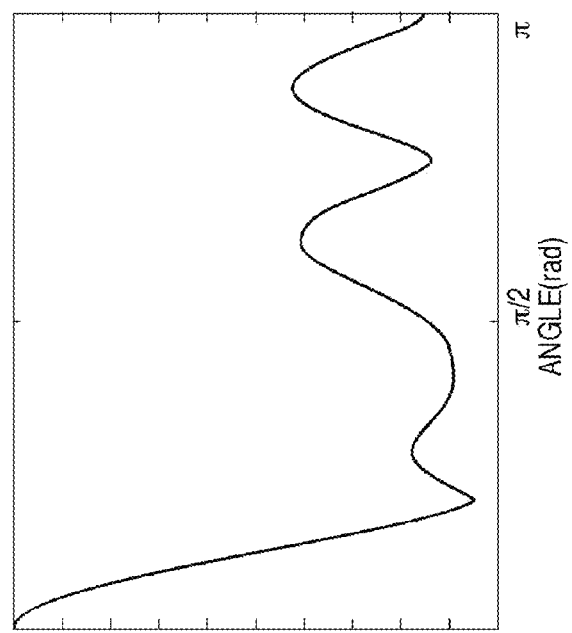

FIG. 7A shows the shape of a PSF when h(t)=1 for 0≤t≤T as a normal exposure condition and h(t)=0 for the other case (which defines not a flutter shutter but a shutter that is continuously open during a shutter open period). FIG. 7B shows the frequency characteristics of the PSF shown in FIG. 7A. In FIG. 7A, the abscissa plots the angles (rad), and the ordinate plots the values of the PSF. In FIG. 7B, the abscissa plots the angles (rad), and the ordinate plots the absolute values of H'(f, ρ).

Referring to FIG. 7B, frequencies having an absolute value=0 periodically appear. This represents a loss of information corresponding to that frequency. When deconvolution is applied in such state, waveforms appear in correspondence with the information-lost frequencies. Hence, coded exposure is made to prevent occurrence of the information-lost frequencies. In other words, in order to prevent occurrence of frequencies having a PSF absolute value=0, the opening and closing timings and open (or close) durations are randomly controlled during the open period of the shutter, thus attaining the flutter shutter.

Figure 8A:
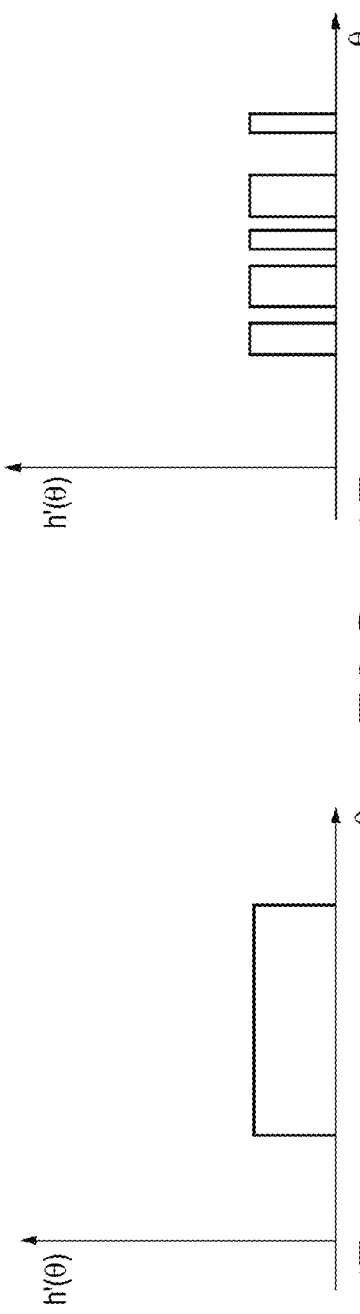
FIGS. 8A and 8B are graphs showing the shape and frequency characteristics of a PSF after coded exposure.
Figure 8B:
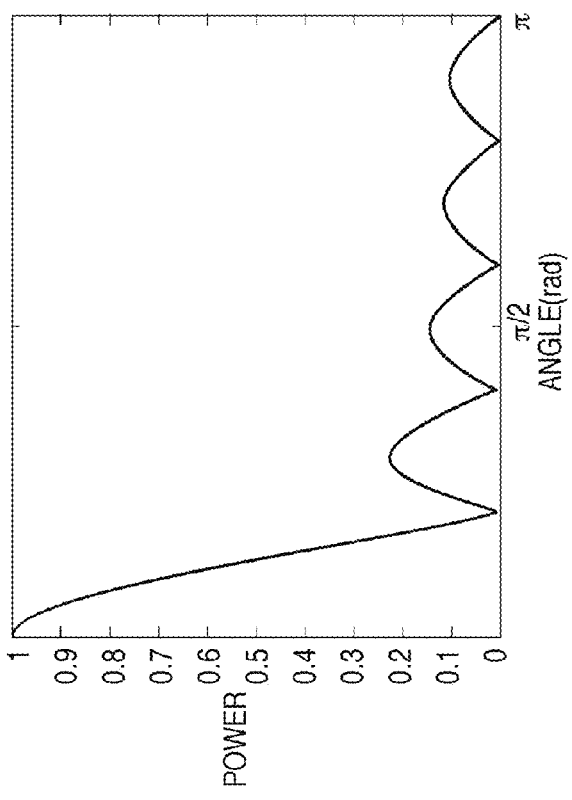

FIG. 8A shows the shape of a PSF after coded exposure, and FIG. 8B shows the frequency characteristics of the PSF shown in FIG. 8A.

After coded exposure, since no information-lost frequencies appear, as shown in FIG. 8B, perfect deconvolution can be theoretically attained by dividing $I_{blur}$(f, ρ) by H'(f, ρ).

Figure 9A:
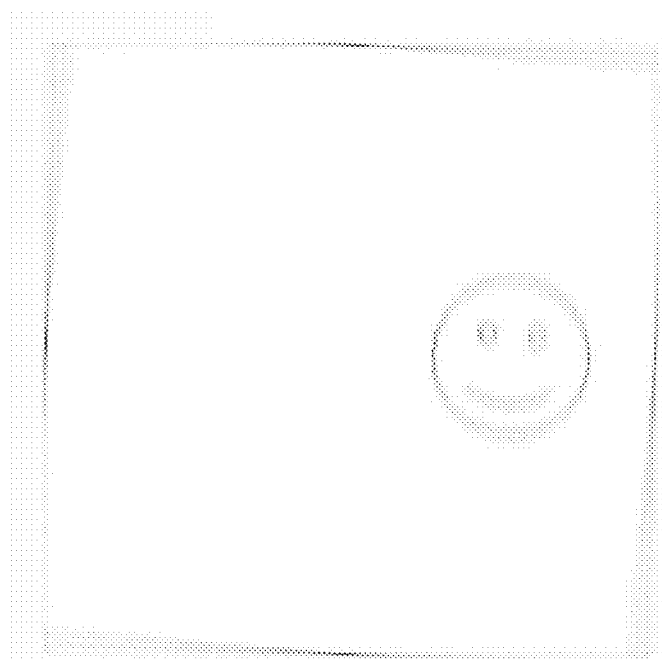
FIGS. 9A and 9B are views respectively showing an image blurred by a rotary vibration and an image in which a blur due to the rotary vibration is corrected.
Figure 9B:
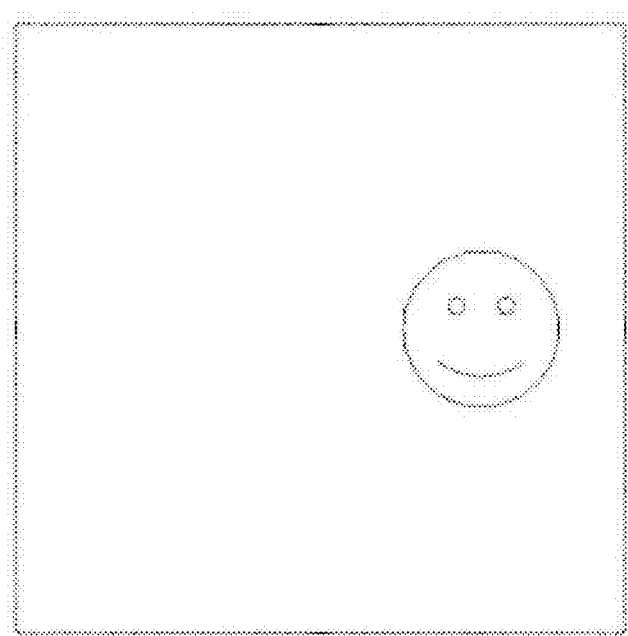

FIG. 9A shows an image (simulation) blurred by a rotary vibration, and FIG. 9B shows an image in which a blur due to the rotary vibration is corrected.

In this manner, an image in which a blur due to a rotary vibration is corrected can be obtained from image capturing data for one image using the rotary vibration information, the opening and closing pattern of the flutter shutter, mutual transformations between the real space and polar coordinate space, and deconvolution. Also, as can be seen from the above description, information required for the correction process of a blur due to a rotary vibration includes the opening and closing pattern, vibration information, and a blurred image due to a vibration generated by additionally synthesizing images according to the opening and closing pattern.

[Image Stabilization Unit]

This embodiment implements a process equivalent to the coded exposure process by dividing whether or not images obtained by time-division exposure are adopted as captured images, without using any flutter shutter.

Figure 10:
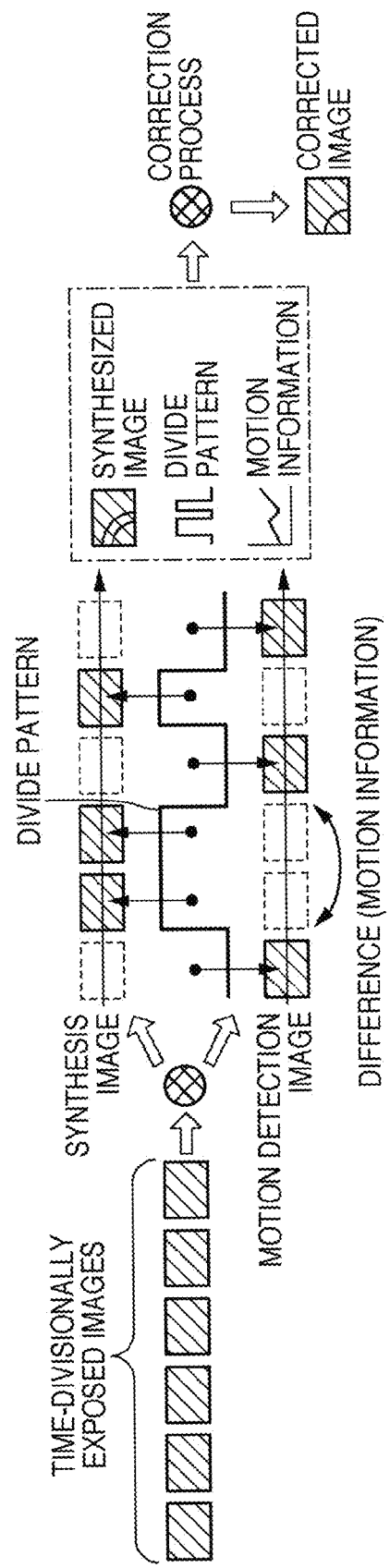
FIG. 10 is a view for explaining an overview of a process of an image stabilization unit.

FIG. 10 is a view for explaining an overview of the processes of the image stabilization unit 428.

The image stabilization unit 428 applies a divide pattern corresponding to the opening and closing pattern to a large number of images captured by time-division exposure to divide the images into those adopted as captured images (an upper stage in FIG. 10) and those which are not adopted (a lower stage in FIG. 10). Note that images adopted as captured images will be referred to as "synthesis images", and those which are not adopted will be referred to as "motion detection images".

Next, the image stabilization unit 428 extracts a difference between the motion detection images having neighboring imaging timings as motion information, and generates a synthesized image by synthesizing the synthesis images. Then, the unit 428 executes a correction process based on the synthesized image, divide pattern, and motion information, thereby generating a corrected image in which a blur due to a vibration is corrected.

Note that motion information may be acquired from the motion information detector 426 without detecting it from the motion detection images. When motion information is acquired from the motion information detector 426, the need for calculating the displacement amount can be obviated, and motion information can be obtained at high speed and with high precision.

Figure 11:
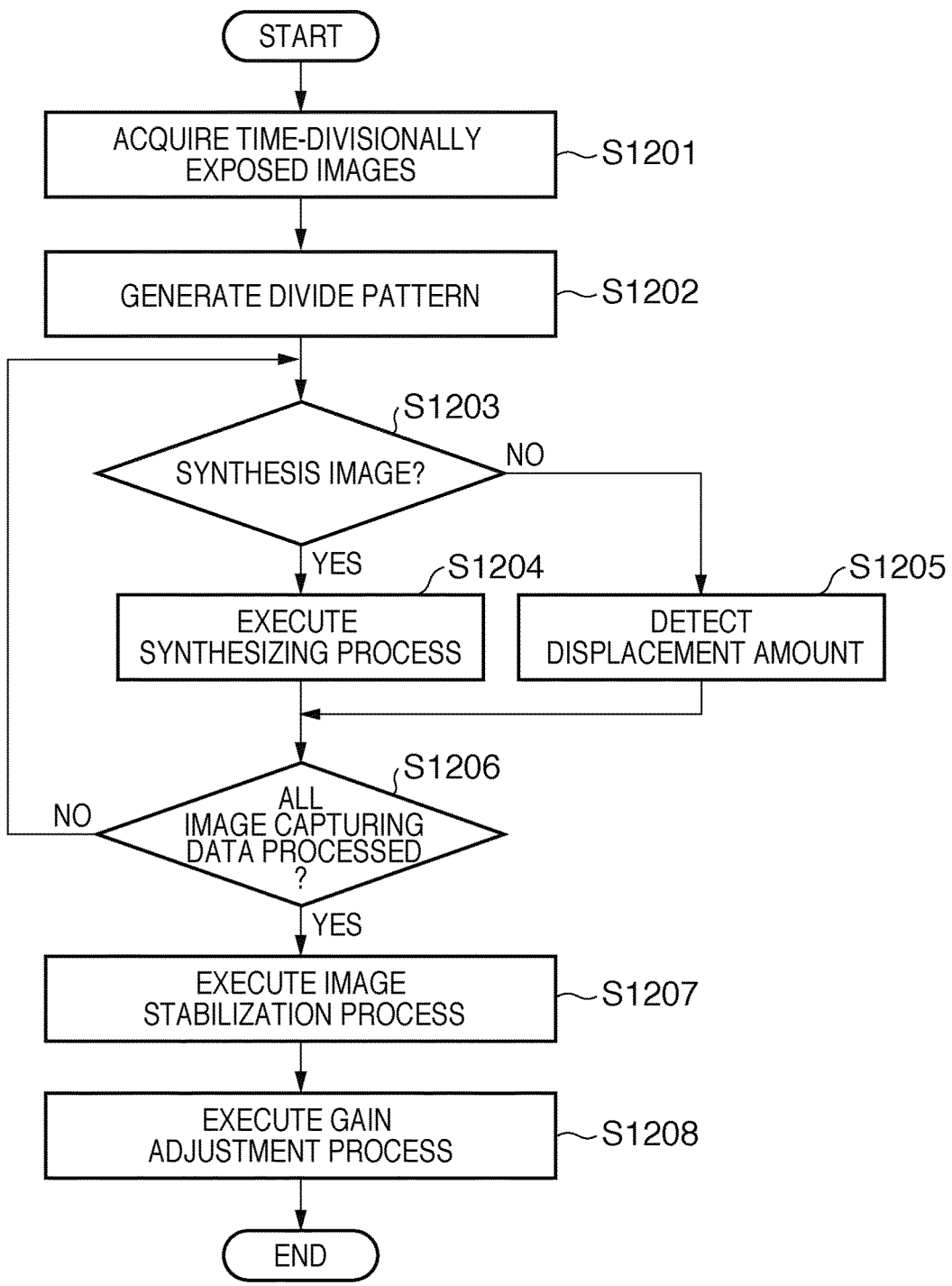
FIG. 11 is a flowchart for explaining the process of the image stabilization unit.

FIG. 11 is a flowchart for explaining the process of the image stabilization unit 428.

The image stabilization unit 428 acquires a large number of image capturing data which are time-divisionally exposed under the control of the exposure condition generator 427 within an exposure time decided by the photometry unit 414 (S1201). As will be described in detail later, the image stabilization unit 428 generates a divide pattern in which a state corresponding to a synthesis image is represented by '1' and that corresponding to a motion detection image is represented by '0' (S1202).

Then, the image stabilization unit 428 determines according to the divide pattern whether each of the acquired image capturing data is a synthesis image or motion detection image (S1203). Then, the unit 428 synthesizes synthesis images in turn to generate a synthesized image (S1204). This synthesizing process can be a process for simply adding pixel data at the same coordinate positions of the image capturing data to each other. With such synthesizing process, image capturing data equivalent to that obtained by the flutter shutter can be obtained. In a displacement amount detection process (S1205), as will be described in detail later, the unit 428 calculates a displacement of an object between a motion detection image of interest and an immediately preceding motion detection image, and sets the calculated displacement as a displacement amount between the two motion detection images.

The image stabilization unit 428 then determines whether the synthesizing process or displacement amount detection process is complete for all the time-divisionally exposed image capturing data (S1206). If image capturing data to be processed still remain, the unit 428 repeats the processes in steps S1203 to S1205.

After completion of the synthesizing process and displacement amount detection process for all the time-divisionally exposed image capturing data, the image stabilization unit 428 executes an image stabilization process (S1207). That is, the unit 428 applies the image stabilization process to the synthesized image generated in step S1204 using the divide pattern generated in step S1202 and motion information which combines the displacement amounts detected in step S1205, thereby generating image capturing data in which a blur due to a vibration is corrected. Then, the unit 428 executes a gain adjustment process (S1208), and outputs the image capturing data.

When exposure for an exposure time set by the photometry unit 414 is made, properly exposed image capturing data can be obtained. However, since the electronic shutter is closed due to time-division exposure during some periods within the exposure time, and motion detection images which are not used in the synthesizing processing are included, image capturing data after synthesis suffers underexposure. Thus, the gain adjustment process is required. An adjustment coefficient G to be multiplied by each pixel data of the image capturing data after synthesis is given by:

$$G = T/(t \times n) \cdot n/v = T/(t \times v) \qquad (6)$$

where T is the set exposure time, t is an exposure time of each image capturing data in the time-division exposure (t<T), n is the number of images captured by the time-division exposure (n>1), and v is the number of synthesis images (v<n).

Note that images time-divisionally exposed during a period of the exposure time T may be temporarily buffered in the buffer memory 424, and the processes in step S1201 and subsequent steps may be executed. However, the divide pattern generation process, divide process, and synthesizing process and displacement amount detection process after the divide process may be executed while making time-division exposure.

In this manner, by dividing time-divisionally exposed images based on the divide pattern, a captured image and motion information are simultaneously acquired, thus implementing the image stabilization process equivalent to the coded exposure process. Furthermore, the two coded exposure processes are parallelly executed to compensate for underexposure, thus preventing an image quality drop. Especially, even when the motion information detector 426 is not included or even when it is included but its output is not available, an image blur due to, for example, a camera shake can be corrected.

When an image displacement is small, in other words, when a vibration is small, image quality can be enhanced by generating a divide pattern which easily selects time-divisionally exposed images as synthesis images.

Generation of Divide Pattern

In order to attain normal correction in the image stabilization process, it is indispensable that the divide pattern does not have any periodicity. For example, upon making convolution having the same size as the captured size, a periodic pattern has to be prevented from being generated in a numerical value string corresponding to that size. Therefore, the image stabilization unit 428 generates a random divide pattern.

However, in case of a random divide pattern, pseudo edges may be generated in an image including many low-frequency components. For this reason, an image acquired first after the full pressing state (when the switch (SW2) 406 is turned on) is analyzed, and a divide pattern may be decided according to low-frequency components included in that image.

For example, when there are six time-divisionally exposed images, whose second, third, and fifth images are to be divided as synthesis images, and whose first, fourth, and sixth images are to be divided as motion detection images, as shown in FIG. 10, a divide pattern h(t)={0, 1, 1, 0, 1, 0} is generated. As described above, h'(θ) as the PSF can be obtained by dividing this h(t) by the motion information.

FIG. 12 is a flowchart for explaining the divide pattern generation process.

The image stabilization unit 428 acquires the number n of images to be time-divisionally exposed from the exposure condition generator 427 (S1301). Then, the unit 428 sets '0' in a divided pattern to divide the first image as a motion detection image (S1302), and decrements the number n of images (S1303).

The image stabilization unit 428 then determines whether or not the number n of images is 1 (S1304). If n=1, the unit 428 sets '0' in the divide pattern to divide the last image as a motion detection image (S1305), thus ending the divide pattern generation process.

On the other hand, if n>1, the image stabilization unit 428 generates a random number R (S1306), and compares the random number R with a probability P of a divide pattern value='1' (S1307). If R≥P, the unit 428 sets '1' in the divide pattern as a synthesis image (S1308); if R<P, it sets '0' in the divide pattern as a motion detection image (S1309). Then, the process returns to step S1303. Note that the probability P is set to be, for example, 50%. However, as described above, when an image displacement is small, a divide pattern which easily selects time-divisionally exposed images as synthesis images may be generated, in other words, it may be generated by setting a high probability P.

In this manner, since images at the beginning and end of time-division exposure are divided as motion detection images, and other images are divided as synthesis images according to the probability P, a divide pattern having no periodicity can be generated.

Generation of Motion Information

The motion information detected by the image stabilization unit 428 from the motion detection images indicates a displacement in the horizontal direction (to be referred to as a horizontal vibration hereinafter), a displacement in the vertical direction (to be referred to as a vertical vibration hereinafter), and a displacement in the rotation direction (to be referred to as a rotary vibration hereinafter). The image stabilization unit 428 detects horizontal and vertical vibrations first, and then a rotary vibration. This is because it is expected that the horizontal and vertical vibrations are larger than the rotary vibration in terms of the camera shake characteristics. When the horizontal and vertical vibrations are corrected by driving the imaging lens 200 and image capturing device 418 to cancel camera vibrations using the output from the motion information detector 426, the horizontal and vertical vibrations need not be detected.

Figure 13:
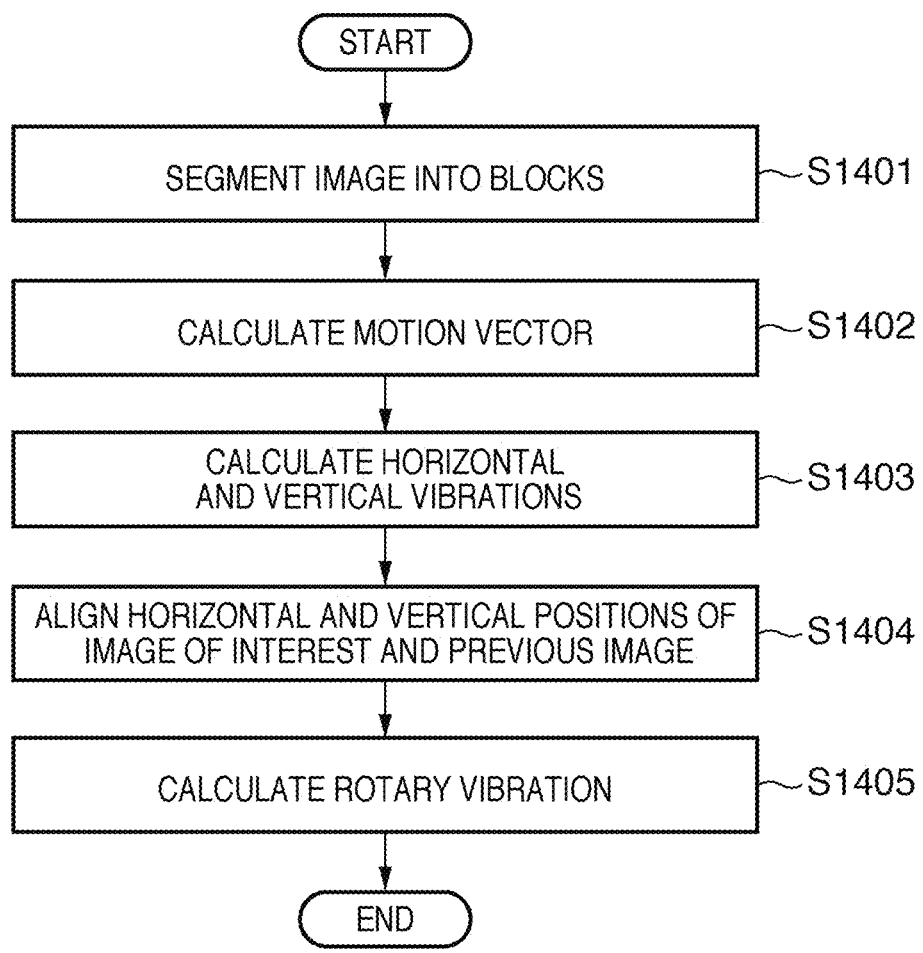
FIG. 13 is a flowchart for explaining a motion information generation process.

FIG. 13 is a flowchart for explaining the motion information generation process.

The image stabilization unit 428 segments a motion detection image of interest (to be referred to as an image of interest hereinafter) into blocks each including m×n pixels (S1401). Then, the unit 428 calculates motion vectors for respective blocks with respect to an immediately preceding motion detection image (to be referred to as a previous image hereinafter) (S1402). The unit 428 calculates a similarity between a block of interest and a block of the previous image (to be referred to as a previous block) corresponding to the block of interest by moving the previous block within a range of ±S pixels from its center. Then, the unit 428 selects a vector which couples the center of the previous block with the highest similarity with that of the block of interest as a motion vector. Assume that the similarity is, for example, a reciprocal of a mean square error between pixel values of pixels of the block of interest and those of pixels of the previous block.

The image stabilization unit 428 then calculates, for example, an average value of horizontal components of the motion vectors of the respective blocks as a horizontal vibration, and that of vertical components of the motion vectors of the respective blocks as a vertical vibration (S1403). Subsequently, the unit 428 moves the image of interest by amounts corresponding to the calculated horizontal and vertical vibrations to match the positions in the horizontal and vertical directions with those of the previous image (S1404), thereby calculating a rotary vibration (S1405). That is, the unit 428 rotates the image of interest to calculate differences between pixels of the image of interest and those of the corresponding previous image, and then calculates an angle corresponding to a minimum average value of the differences between the plurality of pixels as a rotary vibration.

In this manner, synthesis images and motion detection images are selected from an image group captured by time-division exposure based on the divide pattern having no periodicity, and the synthesis images are simply synthesized to generate a synthesized image. Also, motion information is generated from the motion detection images. Then, suitable image stabilization can be applied to the synthesized image using the divide pattern and motion information.

Furthermore, in the image synthesizing process in the image stabilization, an image alignment process, image deformation process, and the like are not required, thus reducing the processing load. Also, motion information can be detected from the motion detection images, and the image stabilization can be implemented without adding any hardware such as a gyro sensor.

Second Embodiment

Image processes according to the second embodiment of the present invention will be described below. Note that the same reference numerals in the second embodiment denote the same components as those in the first embodiment, and a detailed description thereof will not be repeated.

The first embodiment has explained the method of implementing the process equivalent to coded exposure using time-divisionally exposed images and a divide pattern. Also, the first embodiment has explained the example of the divide pattern generation method. The second embodiment will explain another divide pattern generation method.

Figure 14A:
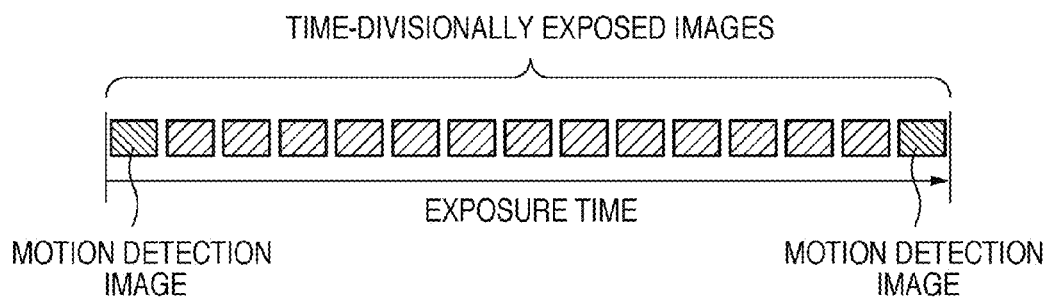
FIGS. 14A to 14C are views for explaining images used to generate motion information.
Figure 14B:
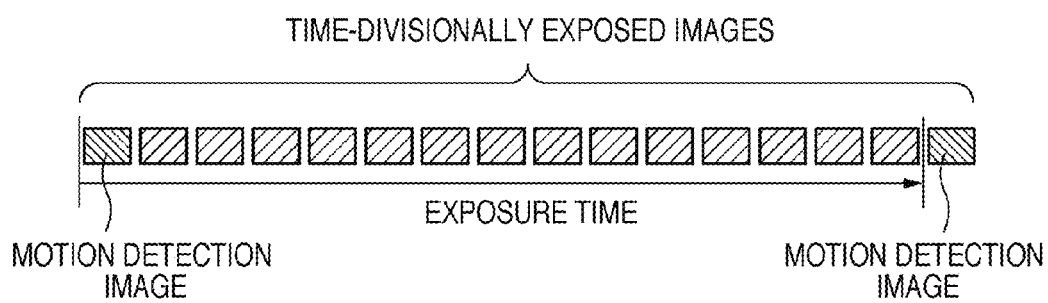
Figure 14C:
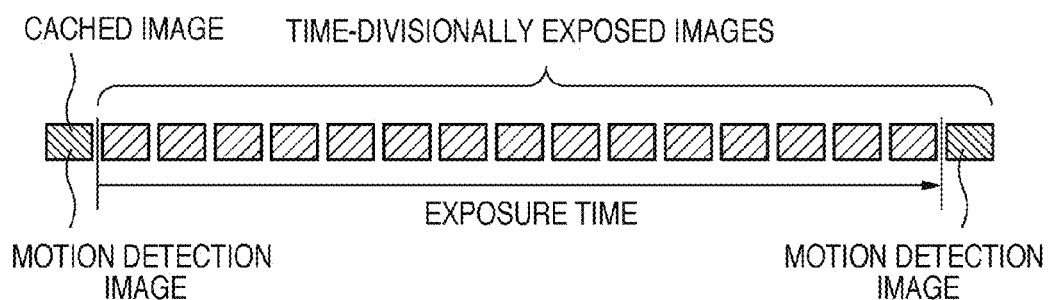

FIGS. 14A to 14C are views for explaining images used to generate motion information.

In order to obtain motion information, at least an image captured when a shutter transits from a close state to an open state and that captured when the shutter transits from the open state to the close state are required. That is, when motion information is generated from motion detection images divided according to a divide pattern, the first and last images acquired by time-division exposure have to be always used to generate motion information (FIG. 14A), as described in the first embodiment.

However, dividing more time-divisionally exposed images as synthesis images is advantageous in terms of an SN ratio (sampling noise ratio) of a synthesized image. In other words, images time-divisionally exposed within a set exposure time are to be divided as synthesis images as much as possible.

Hence, in the second embodiment, after an elapse of the exposure time, another exposure for one image is made to acquire the last image after the exposure time (an image immediately after time-division exposure) (FIG. 14B). In this way, the number of synthesis images can be increased by one to improve image quality. Furthermore, an image immediately before the beginning of exposure is cached, and the cached image is used as the first image (FIG. 14C). As a result, the number of synthesis images can be increased by two to improve image quality. Especially, when the exposure time is short, in other words, when the number n of images acquired by time-division exposure is small, the methods shown in FIGS. 14B and 14C is effective.

Note that the method shown in FIG. 14C is disadvantageous in terms of consumed power since it has to keep caching one image until a full pressing state (when a switch (SW2) 406 is turned on). Hence, after a halfway pressing state (when a switch (SW1) 405 is turned on), and after an exposure time or the like is set, it is desired to start caching.

Third Embodiment

Image processes according to the third embodiment of the present invention will be described below. Note that the same reference numerals in the third embodiment denote the same components as those in the first and second embodiments, and a detailed description thereof will not be repeated.

The above embodiments have explained the method of generating a random pattern as a divide pattern. When synthesis images and motion detection images are randomly divided, the motion detection images are divided irrespective of displacement amounts of images. As a result, an actual exposure amount is reduced, and an adjustment coefficient of a gain adjustment process required to compensate for the reduced exposure amount is increased, thus posing a problem of an increase in noise.

When a plurality of short exposure images are acquired by time-division exposure, and are divided to implement an image stabilization process, images within a predetermined exposure time can always be acquired. Hence, when an image displacement is small as an analysis result of a short exposure image, images are positively divided as synthesis images, thereby increasing an exposure amount and reducing noise when a motion is small.

That is, although a random pattern is generated as the divide pattern in the same manner as in the above embodiments, when an image change is small, a probability P is increased to increase a ratio of images to be divided as synthesis images. When an image change is large, a lower limit value is set for the probability P. Note that the upper and lower limit values of the probability P are set to be, for example, Pmax=65% and Pmin=50%.

FIG. 15 is a flowchart for explaining a divide pattern generation process according to the third embodiment. Unlike in the divide pattern generation process shown in FIG. 12, an update process of the probability P is executed in step S1311. The update process of the probability P (S1311) is as follows.

Square errors between pixels of an image to be processed and corresponding pixels of an image immediately before that image are calculated, and a mean value ΔG of the square errors is calculated. Then, ΔG is compared with a predetermined threshold Gd. When Δ<Gd (ΔG is less than threshold), the probability P is increased by a predetermined value (for example, 1%). However, when the probability P has reached the upper limit value Pmax, it is not increased. When ΔG≥Gd, the probability P is reset to the lower limit value Pmin. Note that an initial value of the probability P is the lower limit value Pmin.

With this processing, when there is no large change between time-divisionally exposed images, the probability P gradually rises. When a large change occurs between time-divisionally exposed images, the probability P can be reset to the initial value.

Note that the example that expresses an image change using the mean square error ΔG has been explained for the sake of simplicity. However, in order to set the probability P more appropriately, a method using, for example, maximum posteriori estimation may be used.

When a gyro sensor or the like, which is used to detect a camera motion due to, for example, a camera shake, is included, the probability P can be changed according to the output from the sensor. For example, when the sensor is an angular velocity sensor, if an angular velocity ω is less than a predetermined value α in step S1311, the probability P is increased by the predetermined value; if the angular velocity ω is equal to or larger than a predetermined value β (>α), the probability P is reset to the minimum value.

When the probability P is updated based on an image displacement, if an object is moving, the probability P is influenced by that motion. When the sensor output is used, the probability P can be controlled based on motion information of a camera, thus obtaining a more appropriate result.

As described above, since a divide pattern is generated by controlling the probability P based on an image change or the output from the sensor used to detect a camera motion, a decrease in exposure amount in image stabilization of this embodiment can be suppressed, and a synthesized image with high image quality can be obtained.

Of course, the probability P may be controlled using the sensor output and the analysis result of time-divisionally exposed images together.

Fourth Embodiment

Image processes according to the fourth embodiment of the present invention will be described below. Note that the same reference numerals in the fourth embodiment denote the same components as those in the first to third embodiments, and a detailed description thereof will not be repeated.

In FIG. 3, the process for correcting an image blur due to a rotary vibration by the coded exposure process has been explained. A process for correcting image blurs due to horizontal and vertical vibrations in addition to the rotary vibration will be explained below.

FIG. 16 is a flowchart for explaining the process for correcting an image blur by the coded exposure process.

The processes in steps S401 and S402 are the same as those in FIG. 3. Subsequently, horizontal vibration information is input (S1703), a PSF in the horizontal direction is calculated based on the horizontal vibration information and exposure information (S1704), and deconvolution is applied based on the calculation result of the PSF (S1705). Next, vertical vibration information is input (S1706), a PSF in the vertical direction is calculated based on the vertical vibration information and exposure information (S1707), and deconvolution is applied based on the calculation result of the PSF (S1708). The subsequent processes (S403 to S408) are the same processes for correcting an image blur due to a rotary vibration as in FIG. 3.

That is, the processes for correcting image blurs due to horizontal and vertical vibrations are the same processes as those for correcting an image blur due to a rotary vibration except that the process for transforming image capturing data into an image on polar coordinates and its inverse transformation process are skipped.

Figure 17:
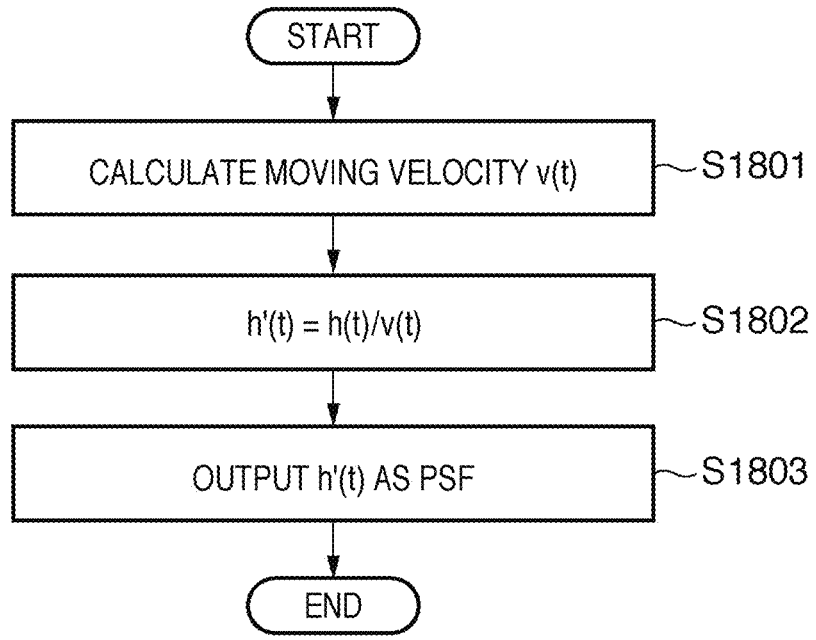
FIG. 17 is a flowchart for explaining a PSF generation process.

FIG. 17 is a flowchart for explaining the PSF generation process (S1704, S1707).

A moving velocity v(t) in the horizontal or vertical direction is calculated based on the input horizontal or vertical vibration information (S1801). Next, exposure information h(t) is divided by the moving velocity v(t) (S1802), and a quotient h'(t)=h(t)/v(t) is output as a PSF (S1803).

Modification of Embodiments

The above embodiments have explained time-division exposure including predetermined exposure periods. Alternatively, uneven-division exposure may be used.

In the process for correcting an image blur by the time-division exposure, synthesis images and motion detection images are divided using a divide pattern having no periodicity. In case of uneven-division exposure, divisionally exposed images may be, for example, alternately divided as synthesis images and motion detection images.

Figure 18:
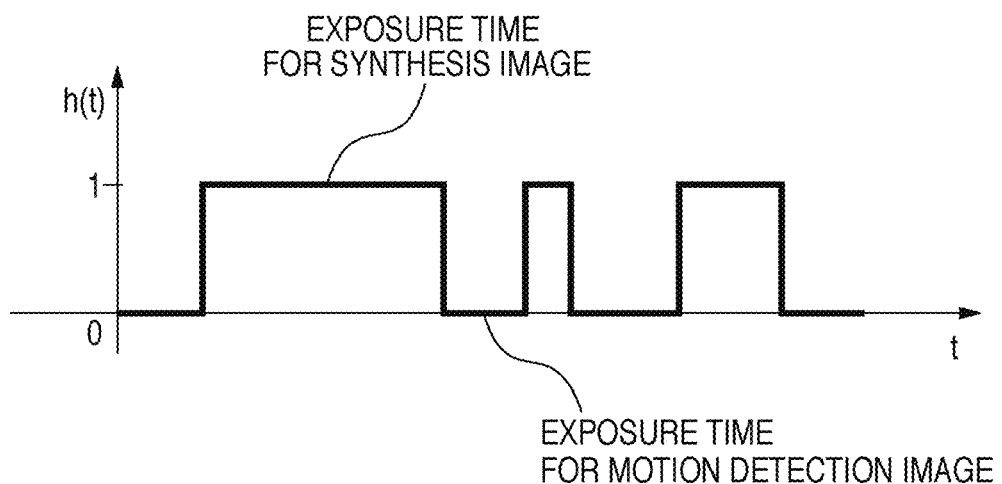
FIG. 18 is a graph showing an example of an opening and closing pattern.

FIG. 18 is a graph showing an example of an opening and closing pattern. Note that the opening and closing pattern shown in FIG. 18 is expressed by state values and durations t in place of a sequence of state values '0' and '1'. Exposure information h(t) is generated from this opening and closing pattern, h(t) is transformed into a function of θ, and h(θ) is divided by motion information, thus obtaining h'(θ) as a PSF.

In the opening and closing pattern shown in FIG. 18, an image acquired in a shutter open state h(t)='1' may be divided as a synthesis image, and that acquired in a shutter close state h(t)='0' may be divided as a motion detection image.

As described above, the process for correcting an image blur need not always use time-division exposure, and can also be applied to division-exposure including irregular exposure periods like a flutter shutter.

Further, software which realizes the functions and processes of the image stabilization unit 428 and the image processor 425, and a large number of images captured by time-division exposure can be provided for a computer equipment such as a personal computer using a computer-readable storage medium such as a memory card. A CPU of the personal computer can execute the processes of the image stabilization unit 428 and the image processor 425 by implementing the provided software, and can generate a corrected image, in which a blur due to a vibration is corrected, from the provided images captured by time-division exposure. In this case, the present invention is realized by the computer equipment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123539, filed May 21, 2009, which is hereby incorporated by reference herein in its entirety.

What is claimed is:

1. An image processing apparatus comprising:
an input section, configured to input a plurality of image capturing data time-divisionally exposed by a capturing unit;
an adopter configured to adopt certain image capturing data to be synthesis images from the plurality of input image capturing data according to a divide pattern that does not have periodicity, wherein the adopter adopts image capturing data to be either synthesis images or motion detection images from the plurality of image capturing data, and adopts image capturing data exposed immediately after the time-division exposure as a motion detection image;
a synthesizer configured to generate synthesized image capturing data by synthesizing the synthesis images;
a corrector configured to correct a vibration of the synthesized image capturing data based on the divide pattern and a motion amount of the capturing unit; and
a detector configured to detect the motion amount at the time of time divisional exposure from the image capturing data of the motion detection images.

2. The apparatus according to claim 1, wherein the adopter adopts image capturing data exposed first and image capturing data exposed last of the plurality of image capturing data as the motion detection images.

3. An image processing apparatus comprising:
an input section configured to input a plurality of image capturing data time-divisionally exposed by a capturing unit;
an adopter configured to adopt certain image capturing data to be synthesis images from the plurality of input image capturing data according to a divide pattern that does not have periodicity, wherein the adopter adopts image capturing data to be either synthesis images or motion detection images from the plurality of image capturing data, and adopts image capturing data exposed immediately before and immediately after the time-division exposure as the motion detection images;
a synthesizer configured to generate synthesized image capturing data by synthesizing the synthesis images;
a corrector configured to correct a vibration of the synthesized image capturing data based on the divide pattern and a motion amount of the capturing unit; and
a detector configured to detect the motion amount at the time of time divisional exposure from the image capturing data of the motion detection images.

4. An image processing apparatus comprising:
an input section configured to input a plurality of image capturing data time-divisionally exposed by a capturing unit;
an adopter configured to adopt certain image capturing data to be synthesis images from the plurality of input image capturing data according to a divide pattern that does not have periodicity, wherein the adopter adopts image capturing data to be either synthesis images or motion detection images from the plurality of image capturing data, and in a case where the motion amount is less than a predetermined threshold, the adopter increases a ratio of image capturing data to be adopted as the synthesis images;
a synthesizer configured to generate synthesized image capturing data by synthesizing the synthesis images;
a corrector configured to correct a vibration of the synthesized image capturing data based on the divide pattern and a motion amount of the capturing unit; and
a detector configured to detect the motion amount at the time of time divisional exposure from the image capturing data of the motion detection images.

5. The apparatus according to claim 1, wherein the corrector comprises a generator configured to generate a point spread function based on the divide pattern and the motion amount, and an arithmetic section configured to execute deconvolution of the synthesized image data using the point spread function.

6. An image processing method comprising:
using a processor to perform the steps of:
inputting a plurality of image capturing data time-divisionally exposed by a capturing unit;
adopting certain image capturing data to be synthesis images from the plurality of input image capturing data according to a divide pattern that does not have periodicity, wherein image capturing data is adopted to be either synthesis images or motion detection images from the plurality of image capturing data, and adopting image capturing data exposed immediately after the time-division exposure as a motion detection image;
generating synthesized image capturing data by synthesizing the synthesis images;
correcting a vibration of the synthesized image capturing data based on the divide pattern and a motion amount of the capturing unit; and
detecting the motion amount at the time of time divisional exposure from the image capturing data of the motion detection images.

7. A non-transitory computer-readable medium storing a computer-executable program for causing a computer to perform an image processing method, the method comprising the steps of:
inputting a plurality of image capturing data time-divisionally exposed by a capturing unit;
adopting certain image capturing data to be synthesis images from the plurality of input image capturing data according to a divide pattern that does not have periodicity, wherein image capturing data is adopted to be either synthesis images or motion detection images from the plurality of image capturing data, and adopting image capturing data exposed immediately after the time-division exposure as a motion detection image;
generating synthesized image capturing data by synthesizing the synthesis images;
correcting a vibration of the synthesized image capturing data based on the divide pattern and a motion amount of the capturing unit; and
detecting the motion amount at the time of time divisional exposure from the image capturing data of the motion detection images.

8. The apparatus according to claim 1, wherein the corrector corrects the vibration based on the divide pattern and the motion amount detected by the detector.

9. An image processing method comprising:
using a processor to perform the steps of:
inputting a plurality of image capturing data time-divisionally exposed by a capturing unit;
adopting certain image capturing data to be synthesis images from the plurality of input image capturing data according to a divide pattern that does not have periodicity, wherein image capturing data is adopted to be either synthesis images or motion detection images from the plurality of image capturing data, and image capturing data exposed immediately before and immediately after the time-division exposure are adopted as the motion detection images;
generating synthesized image capturing data by synthesizing the synthesis images;
correcting a vibration of the synthesized image capturing data based on the divide pattern and a motion amount of the capturing unit; and
detecting the motion amount at the time of time divisional exposure from the image capturing data of the motion detection images.

10. An image processing method comprising:
using a processor to perform the steps of:
inputting a plurality of image capturing data time-divisionally exposed by a capturing unit;
adopting certain image capturing data to be synthesis images from the plurality of input image capturing data according to a divide pattern that does not have periodicity, wherein image capturing data is adopted to be either synthesis images or motion detection images from the plurality of image capturing data, and in a case where the motion amount is less than a predetermined threshold, a ratio of image capturing data to be adopted as the synthesis images is increased;
generating synthesized image capturing data by synthesizing the synthesis images;
correcting a vibration of the synthesized image capturing data based on the divide pattern and a motion amount of the capturing unit; and
detecting the motion amount at the time of time divisional exposure from the image capturing data of the motion detection images.

11. A non-transitory computer-readable medium storing a computer-executable program for causing a computer to perform an image processing method according to claim 9.

12. A non-transitory computer-readable medium storing a computer-executable program for causing a computer to perform an image processing method according to claim 10.

* * * * *